US012320555B2

(12) United States Patent
Nguyen et al.

(10) Patent No.: US 12,320,555 B2
(45) Date of Patent: Jun. 3, 2025

(54) JET PUMP APPARATUS AND METHODS FOR STANDING COLUMN WELL SYSTEMS AND DEPLOYMENT THEREOF

(71) Applicant: HER MAJESTY THE QUEEN IN RIGHT OF CANADA AS REPRESENTED BY THE MINISTER OF NATURAL RESOURCES, Ottawa (CA)

(72) Inventors: Alain Nguyen, Montreal (CA); Hamed Bashiri, Montreal (CA)

(73) Assignee: HER MAJESTY THE QUEEN IN RIGHT OF CANADA AS REPRESENTED BY THE MINISTER OF NATUAL RESOURCES, Ottawa (CA)

( * ) Notice: Subject to any disclaimer, the term of this patent is extended or adjusted under 35 U.S.C. 154(b) by 760 days.

(21) Appl. No.: 16/811,049

(22) Filed: Mar. 6, 2020

(65) Prior Publication Data
US 2020/0284475 A1 Sep. 10, 2020

Related U.S. Application Data

(60) Provisional application No. 62/815,775, filed on Mar. 8, 2019.

(51) Int. Cl.
*F24T 10/20* (2018.01)
*E21B 43/38* (2006.01)
(Continued)

(52) U.S. Cl.
CPC ............ *F24T 10/20* (2018.05); *E21B 43/385* (2013.01); *F03G 4/045* (2021.08); *F04B 23/04* (2013.01);
(Continued)

(58) Field of Classification Search
CPC .......... E21B 43/124; E21B 43/13; F04F 5/10; F04F 5/24; F04B 23/08
(Continued)

(56) References Cited

U.S. PATENT DOCUMENTS 513,412 A * 1/1894 Nevill ...................... F04F 5/10
417/550
3,765,477 A * 10/1973 Van Huisen ............ F24T 10/20
976/DIG. 425
(Continued)

FOREIGN PATENT DOCUMENTS

| CN | 102679429 A | * | 9/2012 | |
| DE | 102010040765 A1 | * | 6/2011 | ............. F24D 12/02 |
| JP | H09177507 A | * | 7/1997 | ............... F01K 9/00 |

OTHER PUBLICATIONS

Cn-102679429, English Language Machine Translation (Year: 2012).*
(Continued)

*Primary Examiner* — Wesley G Harris
(74) *Attorney, Agent, or Firm* — Daniel C. Pierron; Widerman Malek. PL

(57) ABSTRACT

The present invention discloses groundwater heat transfer system comprising a primary pump suspended in a well and connected to at least one water supply pipe, a heat exchange system being connected to said primary pump via a secondary pump, a return pipe being connected to the heat exchange system and returning water from the heat exchange system to the well, wherein the primary pump provides motive pressure to a primary nozzle of a liquid jet ejector submerged in the well, which entrains filtered groundwater through a secondary nozzle of the liquid jet ejector, wherein the secondary pump, placed after the primary pump and before the heat exchange system, provides the remaining system head.

5 Claims, 5 Drawing Sheets

(51) Int. Cl.
*F03G 4/00* (2006.01)
*F04B 23/04* (2006.01)
*F04B 47/06* (2006.01)
*F04B 47/08* (2006.01)
*F04F 5/10* (2006.01)
*F24T 10/00* (2018.01)

(52) U.S. Cl.
CPC .............. *F04B 47/06* (2013.01); *F04B 47/08* (2013.01); *F04F 5/10* (2013.01); *F24T 2010/50* (2018.05); *Y02E 10/10* (2013.01)

(58) Field of Classification Search
USPC .......................................... 417/80, 84, 88, 89
See application file for complete search history.

(56) References Cited

U.S. PATENT DOCUMENTS

| | | | | | |
|---|---|---|---|---|---|
| 3,857,244 | A | * | 12/1974 | Faucette | F24T 10/30 165/45 |
| 4,325,228 | A | * | 4/1982 | Wolf | F25B 30/06 165/142 |
| 4,867,646 | A | * | 9/1989 | Coudriet | F04F 5/10 417/43 |
| 2006/0196674 | A1 | * | 9/2006 | Butler | F04F 5/10 166/372 |
| 2007/0223999 | A1 | * | 9/2007 | Curlett | F24T 10/20 405/55 |
| 2012/0174581 | A1 | * | 7/2012 | Vaughan | F24T 10/10 290/40 C |

OTHER PUBLICATIONS

DE-102010040765-A1 English language machine translation (Year: 2011).*
Orio, C., Johnson, C., Rees, S., Chiasson A, Deng, Z and Spitler, J.D. A Survey of Standing Column Well Installations in North America. ASHRAE Transactions 2005(111):109-21.
Karassik, I.J., Messina, J.P., Cooper, P. and Heald. C.C., Pump handbook, 3rd edition—Chapter 4, Section 4.2—Jet pump applications, Jumpeter, A.M.: McGraw-Hill, 2000:759-785.
Rees, S., Advances in Ground-Source Heat Pump Systems—Chapter 10—Standing column wells, Pasquier P. et al.: Woodhead Publishing, 2016:269-294.

* cited by examiner

JET PUMP APPARATUS AND METHODS FOR STANDING COLUMN WELL SYSTEMS AND DEPLOYMENT THEREOF

RELATED APPLICATIONS

This application claims priority under 35 U.S.C. § 119(e) of U.S. Provisional Patent Application Ser. No. 628,155,775 filed on Mar. 8, 2019 and titled JET PUMP APPARATUS AND METHODS FOR STANDING COLUMN WELL SYSTEMS AND DEPLOYMENT THEREOF. The content of this application is incorporated herein by reference.

FIELD OF THE INVENTION

The present invention discloses jet pump apparatus for standing column well systems and methods of deployment thereof. In particular, the invention discloses a novel design configuration of a jet pump system for standing column wells to pump groundwater.

BACKGROUND OF THE INVENTION

A standing column well is a hybrid between an open and closed loop borehole heat exchanger.

In recent years, standing column well systems have gained significant interest and popularity due to their high efficiency and compact configuration.

In the most common commercial design for standing column well systems, groundwater is pumped from a well with a submersible pump installed within a riser pipe screened or slotted at its base, passed through a heat exchanger before finally being returned to the well (see Orio, C., Johnson et al. *A Survey of Standing Column Well Installations in North America*, ASHRAE Transactions 2005 (111):109-21).

To simplify the installation, the riser pipe may be omitted.

One of the disadvantages of such standing column well design systems is that electrical wirings need to be placed inside the borehole to supply electricity to the submersible pump.

Another disadvantage of such standing column well design systems is that designers must also account for some required clearance space for maintenance works and sometimes premature pump replacement due to scaling and corrosion.

These constraints often make it impossible to install a standing column well, especially when the only land available for the borehole heat exchanger field is below buildings.

Even if when space is not an issue, mechanical engineers and heating, venting and airconditioning (HVAC) specialists are often reluctant to propose open loop systems due to the potential risks associated with groundwater.

Thus, dealing with groundwater and submerged mechanical equipment have been a source of concerns that have curbed the market penetration of standing column well systems.

It is known in the existing prior art that pumping groundwater can alternatively be accomplished using a jet centrifugal pump. This type of system is known in potable water well systems and is commercially available as "jet pump" system (see Karassik, I. J. et al. *Pump Handbook*, 3rd edition, Chapter 4, Section 4.2, Jet pump applications, Jumpeter, A. M.: McGraw-Hill, 2000:759-785.)

In this type of systems, the surface pump is used to provide high pressure water to the primary nozzle of a submerged ejector, where pressure energy is converted into kinetic energy. The high-velocity jet entrains groundwater through the secondary nozzle of the ejector. The two streams mix in the mixing tube, and then the high-speed mixed flow is decelerated in the diffuser and static pressure is recovered. This results in a pressure increase provided to the suction stream across the ejector.

Jet pumps are typically employed for low capacity systems with relatively small water flow. This is due to the high motive pressure required to entrain groundwater at the jet ejector and to pressurize it for domestic usages.

These operating conditions require the centrifugal pumps to work outside their optimal conditions. The pumping efficiency of jet pump systems are typically around 20% to 30% and can be even lower for deep wells.

Jet pumps also need to be primed prior to running the system. For large capacity systems, getting a large volume of water into the jet pump without any air can be difficult, especially when no other source of water is available.

This drawback makes jet pump systems unreliable in case of a loss of prime. For these reasons, submersible pumps have been always preferred over jet pumps for commercial and industrial applications. To the inventors' knowledge, there are no available off-the-shelf jet pumps for the operating conditions typical of standing column well systems.

Therefore, there remains a need to find alternative and efficient solutions for pumping groundwater in standing column well systems.

SUMMARY OF THE INVENTION

The present invention provides solutions for pumping groundwater in standing column well systems. The present invention utilizes a jet pump system to significantly lessen groundwater pumping related problems for standing column well applications.

According to one aspect of the invention, there is provide a groundwater heat transfer system comprising:
  a primary pump, said primary pump is suspended in a well and connected to at least one water supply pipe, said at least one water supply pipe extending downhole substantially to the bottom of said well,
  a heat exchange system, said heat exchange system being connected to said primary pump via a secondary pump,
  a return pipe, said return pipe being connected to said heat exchange system and returning water from said heat exchange system to said well,
  wherein the primary pump provides motive pressure to a primary nozzle of a liquid jet ejector submerged in the well, which entrains filtered groundwater through a secondary nozzle of the liquid jet ejector, and
  wherein the secondary pump, placed after the primary pump and before the heat exchange system, provides the remaining system head.

According to a preferred embodiment, a check valve is placed in proximity of the secondary nozzle of the liquid jet ejector to prevent loss of prime when the pump is idle.

According to a preferred embodiment, a strainer is placed before the heat exchange system to remove impurities.

According to a preferred embodiment, the groundwater is pumped to the surface only at atmospheric pressure via the at least one water supply pipe.

According to a preferred embodiment, the primary pump is suspended above ground level.

According to a preferred embodiment, the well is a standing column well.

According to a preferred embodiment, the primary pump is a jet pump.

According to a preferred embodiment, there are multiple standing column wells in parallel.

Other features and advantages of the present invention will become apparent from the following detailed description and the accompanying drawings, which illustrate, by way of example, the principles of the invention.

BRIEF DESCRIPTION OF THE DRAWINGS

By way of example only, preferred embodiments of the present invention are described hereinafter with reference to the accompanying drawings, wherein.

DETAILED DESCRIPTION OF THE INVENTION

It is to be understood that the disclosure is not limited in its application to the details of the embodiments as set forth in the following description. The invention is capable of other embodiments and of being practiced or of being carried out in various ways.

Furthermore, it is to be understood that the terminology used herein is for the purpose of description and should not be regarded as limiting. Contrary to the use of the term "consisting", the use of the terms "including", "containing", "comprising", or "having" and variations thereof is meant to encompass the items listed thereafter and equivalents thereof as well as additional items. The use of the term "a" or "an" is meant to encompass "one or more". Any numerical range recited herein is intended to include all values from the lower value to the upper value of that range.

Figure 1:
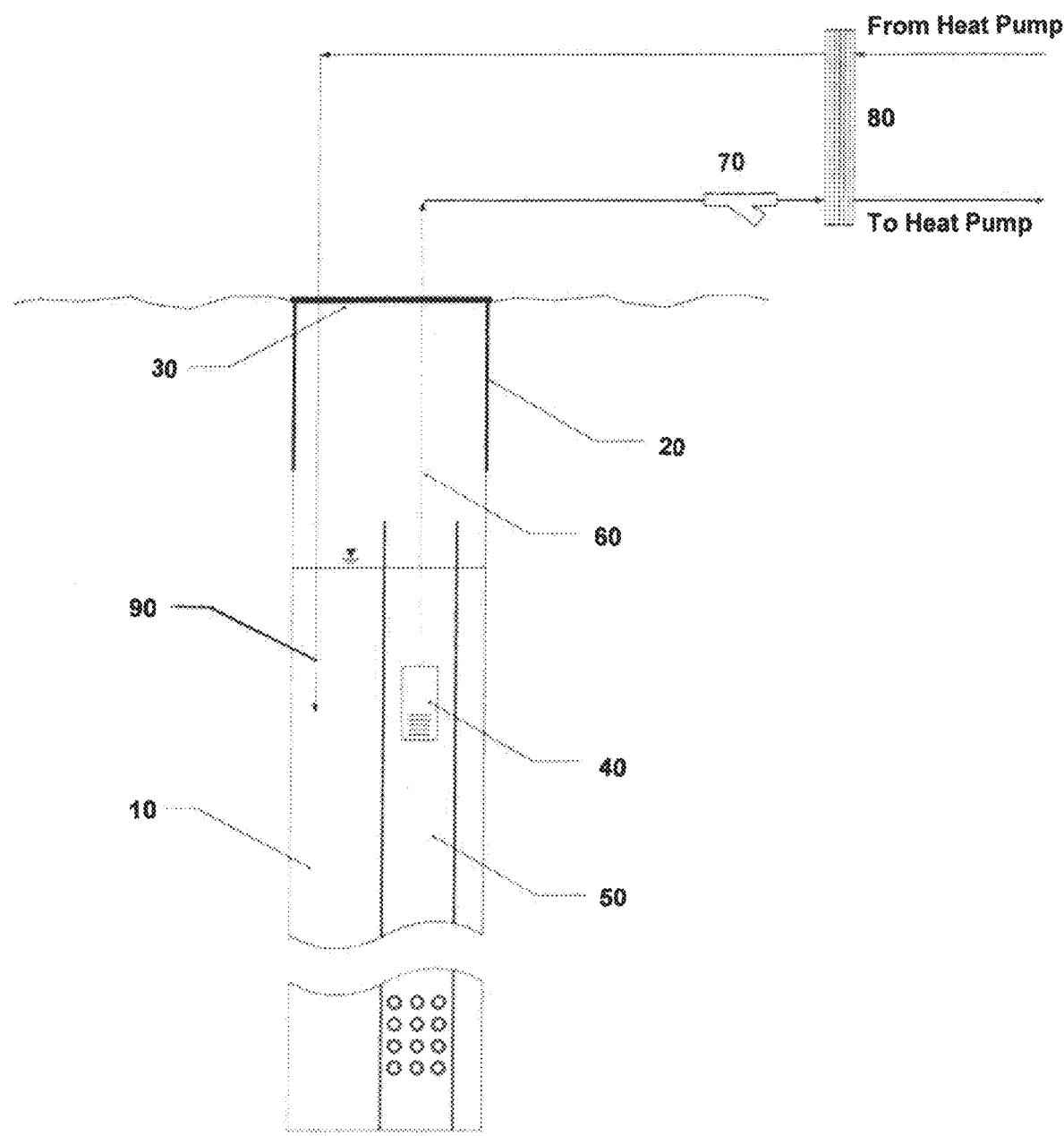
FIG. 1 is a flow diagram showing a conventional standing column well design with riser pipe.

As shown in FIG. 1, the most common commercial design for SCW systems, a standing column well 10 is enclosed with a well casing 20 and a well cap 30. Groundwater is pumped from well 10 with a submersible pump 40 installed within a riser pipe 50 screened or slotted at its base, via a supply pipe 60 and passed through a strainer 70 then to a heat exchanger 80 before finally being returned to the standing column well 10 via a return pipe 100.

Sometimes to simplify the installation, the riser pipe may be omitted.

Figure 2:
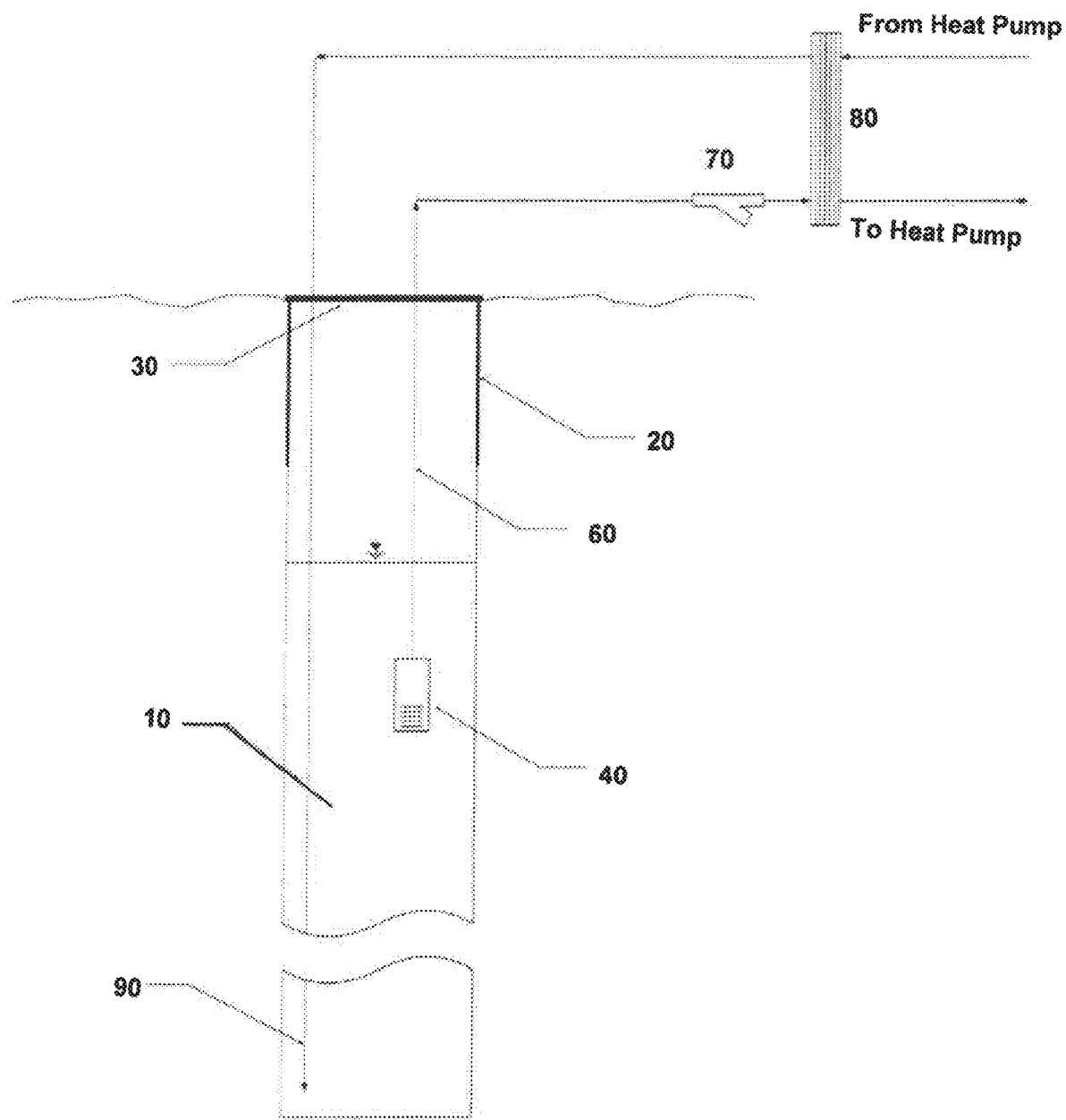
FIG. 2 is a flow diagram showing a conventional standing column well design without riser pipe.

As shown in FIG. 2, a standing column well 10 is enclosed with a well casing 20 and a well cap 30. Groundwater is pumped from well 10 with a submersible pump 40, via a supply pipe 60 and passed through a strainer 70 then to a heat exchanger 80 before finally being returned to the standing column well 10 via a return pipe 100.

Figure 3:
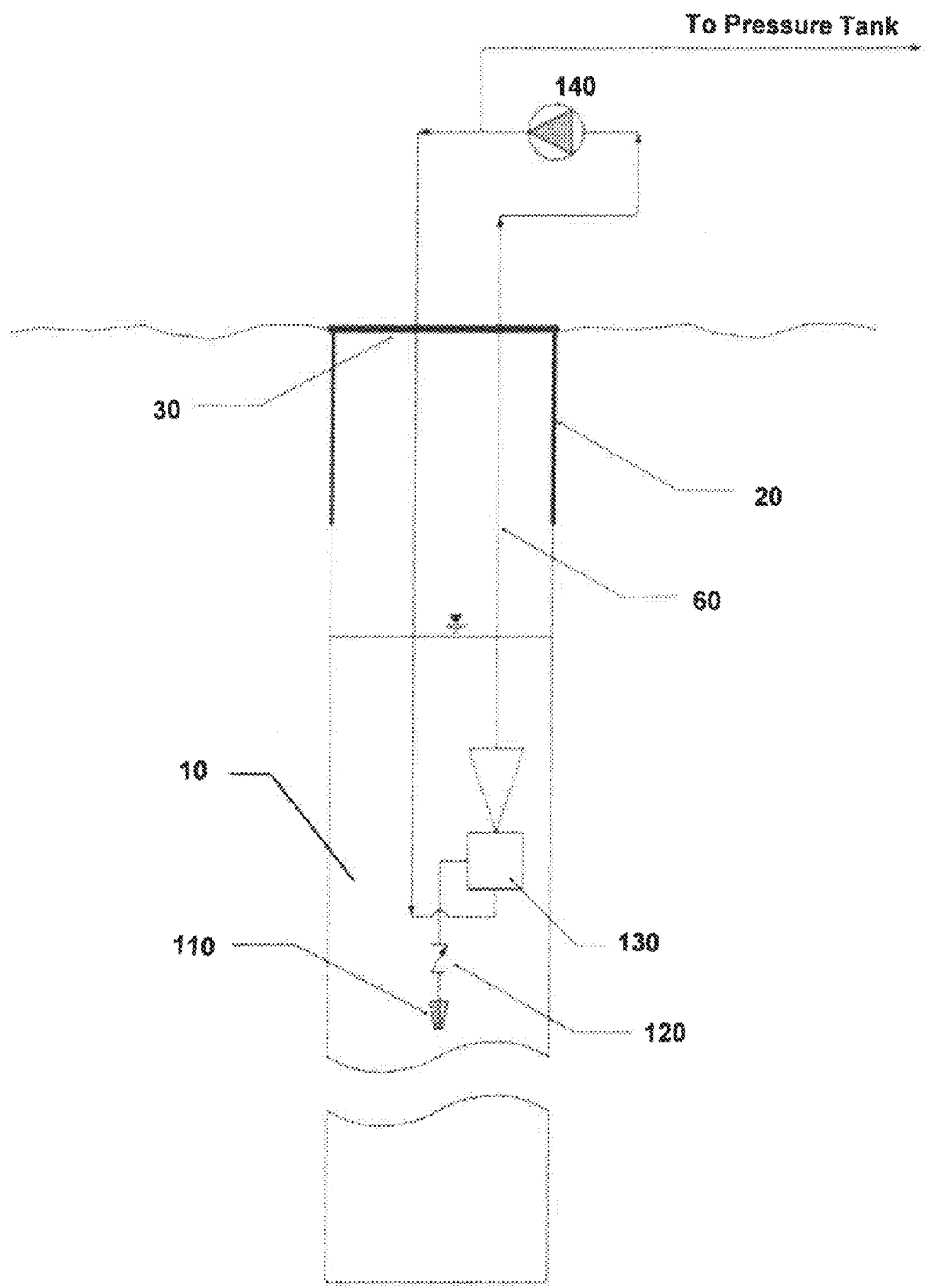
FIG. 3 is a flow diagram showing a conventional jet pump system.

FIG. 3 illustrates a conventional jet pump where groundwater is delivered to the pressure tank at the required gauge pressure.

As shown in FIG. 3, a standing column well 10 is enclosed with a well casing 20 and a well cap 30. Groundwater is pumped from well 10 with through a filter 110 and check valve 120 and a liquid jet ejector 130 of a jet pump, via a supply pipe 60 to a primary pump 140 before being delivered to a pressure tank.

To the inventors' knowledge, commercial jet pump systems have not been used for commercial groundwater heat pump applications.

The present invention allows standing column wells to extend their application for new constructions where the borehole heat exchanger field is located, for example underneath the building.

Figure 4:
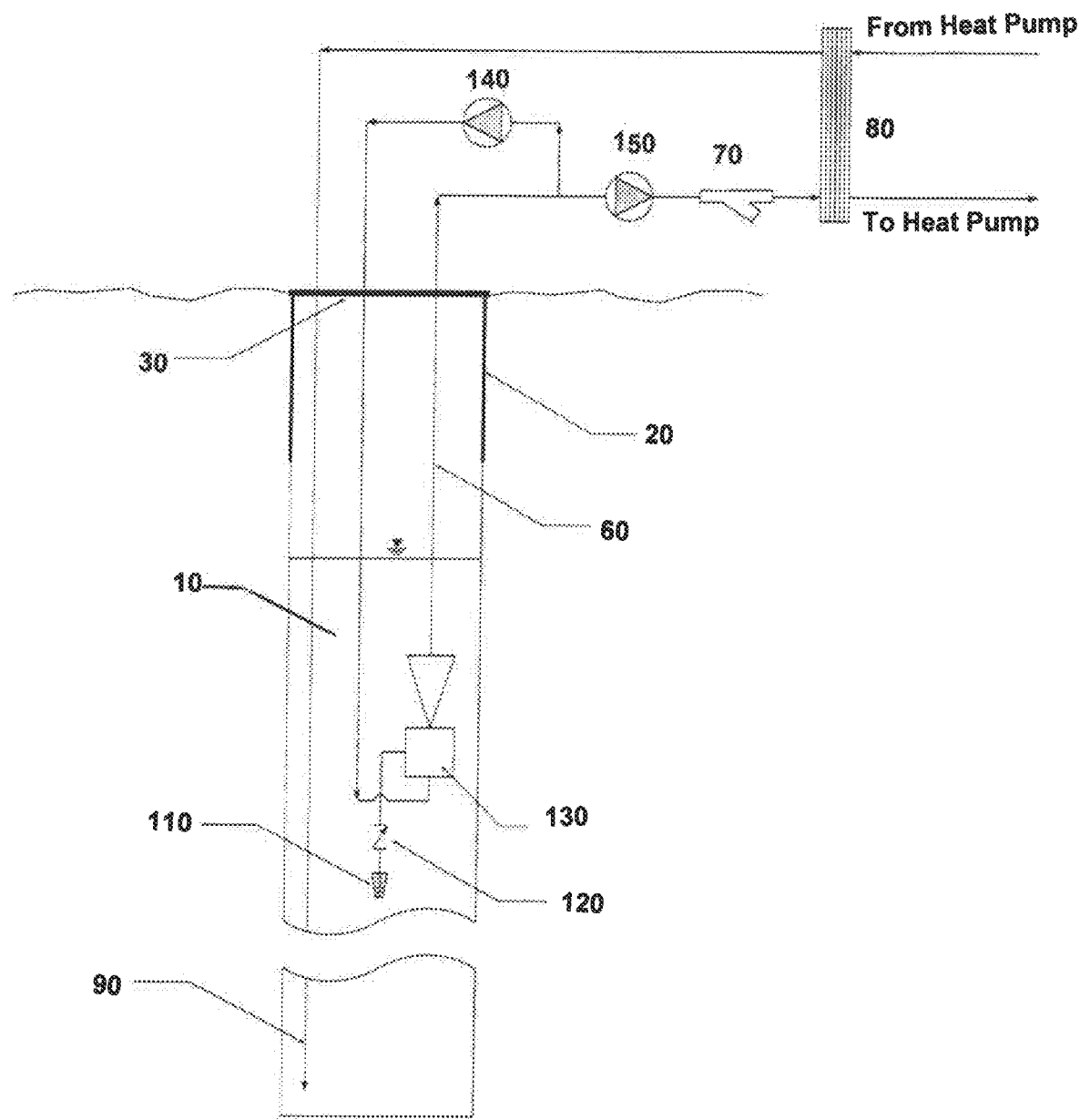
FIG. 4 is a flow diagram showing an embodiment according to the present invention.

FIG. 4 illustrates an embodiment of the invention that provides a novel design configuration of a jet pump system for standing column well applications.

As shown in FIG. 4, a standing column well 10 is enclosed with a well casing 20 and a well cap 30. A primary (centrifugal) pump 140 is used to provide the motive pressure to a primary nozzle of the submerged liquid jet ejector 130, which entrains filtered groundwater (via filter 110) through a secondary nozzle. A check valve 120 placed near the secondary nozzle of the liquid jet ejector 130 prevents loss of prime when the pump is idle. To minimize the required motive pump pressure, the groundwater is pumped to the surface only at atmospheric pressure via a supply pipe 60. Doing so increases the primary flow while maintaining the motive pressure, thereby increasing the pump efficiency.

A secondary pump 150 is then used to provide the remaining system head. After passing through a strainer 70 and a plate heat exchanger 80, the groundwater is reinjected at the bottom of the standing column well 10 through a return pipe 90.

Figure 5:
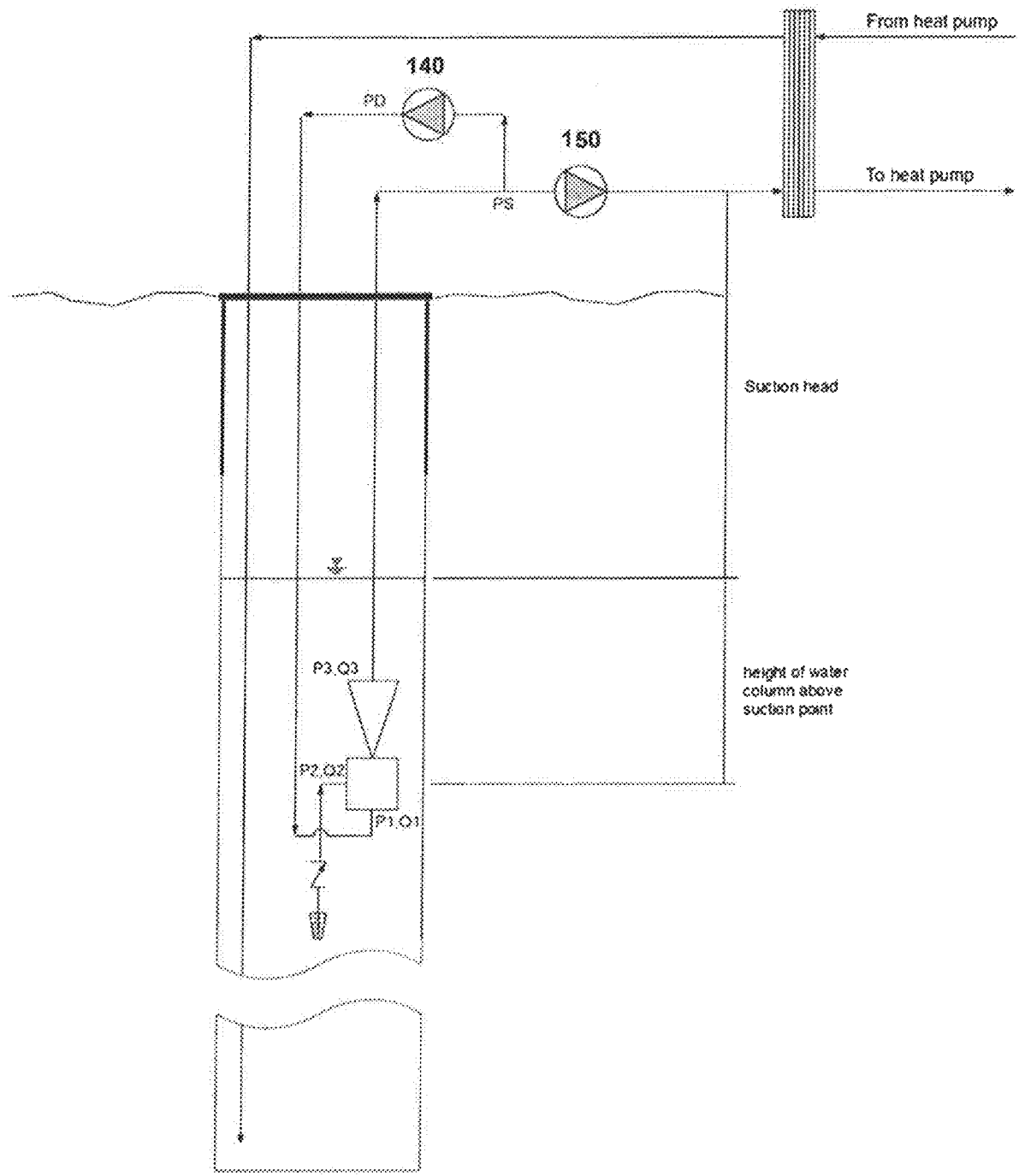
FIG. 5 is a flow diagram showing an embodiment according to the present invention.

Referring to FIG. 5, for a submerged ejector installed inside a standing column well, let P1 and Q1 be the fluid pressure and flow, respectively, at the primary nozzle, let P2 and Q2 be fluid pressure and flow, respectively, at the secondary nozzle of a submerged ejector, and let P3 and Q3 be the pressure and flow at the discharge.

Considering a groundwater heat pump system of 105 kW of heating capacity that requires a flow of 20 m³/hr (Q2) and a water jet ejector positioned under a height of water column equivalent to 1 barg (P2). The required conditions at the primary nozzle are the following:

P1: 5 bar
Q1: 20 m³/hr
The discharge conditions are the following:
P3: 2 barg
Q3: 40 m³/hr In this case, the pressure recovery is 1 barg. Considering a required suction head of 1 barg, the primary pump needs to provide a discharge pressure (PD) of $$PD = P1 - P2 - \text{suction head}$$

$$PD = 5 \text{ barg} - 1 \text{ barg} - 1 \text{ barg} = 3 \text{ barg}$$

The pressure at the pump suction pressure (PS) is therefore:

$$PS = P3 - P2 - \text{suction head}$$

$$PS = 2 \text{ barg} - 1 \text{ barg} - 1 \text{ barg} = 0 \text{ barg}$$

For a primary pump with an overall efficiency of 60% (eff), the required primary pump power is calculated as following:

$$W = Q1 * (PD - PS) * 100 \frac{\text{kW} * \text{s}}{\text{m}^3 * \text{barg}} * \frac{1}{\text{eff}}$$

-continued $$W = 20\frac{m^3}{3600\ s} * (3\ barg - 0\ barg) * 100\frac{kW*s}{m^3*barg} * \frac{1}{0.6} = 2.8\ kW$$

Therefore, the pumping efficacy is optimized.

This system is not limited to a single standing column well and can be extended to multiple wells in parallel.

The pumping efficiency is optimized by selecting the ejector geometry and location for maximum pressure recovery for the specified operating conditions. Moreover, different configurations of ejector, including parallel, or in series, may be engaged.

The jet pump systems as disclosed in the present invention is therefore a viable alternative to submersible pumps for standing column well systems applications. Even a temporary loss of prime would not prevent the system from running, as water (for priming) is generally available and supplied by the municipal water system.

Groundwater loop systems have had bad reputations in the past due to groundwater related problems. Unsurprisingly, one of the critical issues in the design of any system handling groundwater is to configure it in a way to eliminate or minimize problems arising from groundwater.

The jet pump systems as disclosed in the present invention can be used to significantly lessen groundwater pumping related problems for standing column well applications.

Moreover, the present invention provides a practical solution to utilize standing column well systems when there is a limited accessibility to the well due to the lack of space or location.

While the present invention has been described in considerable detail with reference to certain preferred and/or exemplary embodiments, it will be understood by those skilled in the art that various changes may be made and equivalents may be substituted for elements thereof without departing from the scope of the invention. In addition, many modifications may be made to adapt a particular situation or material to the teachings of the present invention without departing from the essential scope thereof. Therefore, the scope of the appended claims should not be limited by the preferred embodiments set forth in the examples, but should be given the broadest interpretation consistent with the description as a whole.

The invention claimed is:

1. An open-looped groundwater heat transfer system for standing column groundwater heat pump applications, said system comprises:
   a primary pump, said primary pump is connected to at least one water supply pipe, said at least one water supply pipe extending downhole to a bottom of a well,
   a heat exchange system, said heat exchange system being connected to said primary pump via a secondary pump,
   a return pipe, said return pipe being connected to said heat exchange system and returning water from said heat exchange system to said well,
   wherein the primary pump provides motive pressure to a primary nozzle of a liquid jet ejector submerged in the well, which entrains filtered groundwater through a secondary nozzle of the liquid jet ejector, and
   wherein the secondary pump, placed after the primary pump and before the heat exchange system, provides a remaining system head.

2. The open-looped groundwater heat transfer system according to claim 1, wherein a check valve is placed in proximity of the secondary nozzle of the liquid jet ejector to prevent loss of prime when the primary pump is idle.

3. The open-looped groundwater heat transfer system according to claim 1, wherein a groundwater is pumped to ground level only at atmospheric pressure via the at least one water supply pipe.

4. The open-looped groundwater heat transfer system according to claim 1, wherein said primary pump is suspended above ground level.

5. The open-looped groundwater heat transfer system according to claim 1, wherein said well is a standing column well.

\* \* \* \* \*